Sept. 11, 1923.
A. H. DE VOE
BELT COUPLING
Filed April 9, 1918
1,467,713
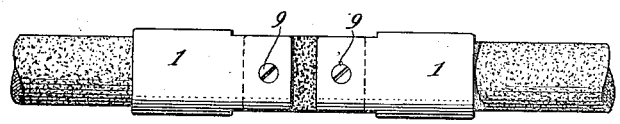
Fig.1
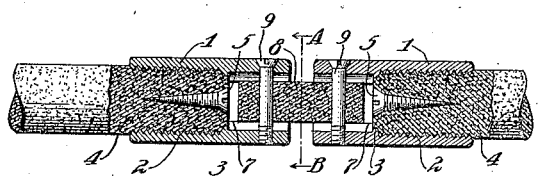 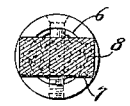
Fig.2   Fig.3
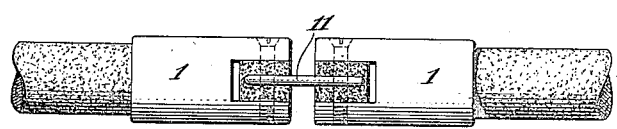
Fig.4
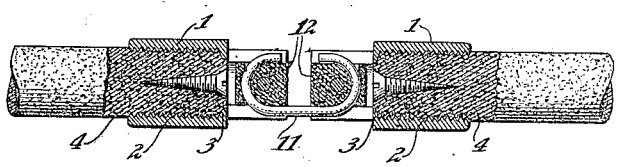
Fig.5
WITNESSES
L. E. Fischer.
Walter L. Pipes
INVENTOR
Albert H. DeVoe
BY
Henry J. Miller
ATTORNEY Patented Sept. 11, 1923.

1,467,713

UNITED STATES PATENT OFFICE.

ALBERT H. DE VOE, OF WESTFIELD, NEW JERSEY, ASSIGNOR TO THE SINGER MANUFACTURING COMPANY, A CORPORATION OF NEW JERSEY.

BELT COUPLING.

Application filed April 9, 1918. Serial No. 227,472.

*To all whom it may concern:*

Be it known that I, ALBERT H. DE VOE, a citizen of the United States, residing at Westfield, in the county of Union and State of New Jersey, have invented certain new and useful Improvements in Belt Couplings, of which the following is a specification, reference being had therein to the accompanying drawings.

This invention relates to belts and particularly to couplings for the ends of round belts.

It aims to provide new and improved means for securing the ends of a round belt of leather or rope but especially the latter in a firm manner but one readily permitting the belt length being shortened to take up slack.

For each belt end an internally threaded ferrule element is provided and a wedge element in the form of a screw cooperates therewith to grip and hold the belt. A link connects the ferrule elements, the link being made of leather or metal encased at its ends in leather.

In the drawings Fig. 1 is a side view of a coupling for a round belt with a leather link. Fig. 2 a longitudinal section of the same and Fig. 3 a cross-section on the line *a—b*, Fig. 2. Fig. 4 is a top view of a coupling with a metal reinforced leather link and Fig. 5 a longitudinal section thereof.

In the form of the invention illustrated in Figs. 1, 2 and 3, the ferrule elements 1 are internally threaded as at 2 up to the shoulder 3 to receive the belt ends 4 into each of which a wedge element 5, preferably in the form of a screw, is adapted to be inserted to expand the belt against the unyielding ferrule element and thereby grip it firmly and positively. The opposite end of each ferrule element may be bored axially as indicated at 6 and slotted axially as indicated at 7 to receive an end of a link 8 of some suitable tough material, such as leather, and pins 9 are threaded as shown at 10 into the ferrule elements at right angles to their longitudinal axes.

The form of the invention illustrated in Figs. 4 and 5 is much the same as that shown in Figs. 1, 2 and 3. Instead of a leather link connecting the ferrule elements a metallic link 11 is employed, the wire being poked through the leather washers 12 surrounding the pins 9 and the ends of the wire being bent in semi-circles about the pins. In operation the surface of the leather washer 12 takes on a glaze which renders it very durable while preserving its sound-deadening quality.

It will thus be apparent that I have devised simple and effective construction for coupling together the ends of a belt, and one in which the belt length may be readily shortened.

Having thus set forth the nature of the invention, what I claim herein is—

In a belt coupling, articulated means for holding the opposite ends of a belt including ferrule and wedge elements cooperating to grip each of the belt ends, and a metallic link pivotally connecting the ferrule elements each of the pivots being provided with a sound-deadening member.

In testimony whereof I have signed my name to this specification.

ALBERT H. DE VOE.